(12) United States Patent
Shefi

(10) Patent No.: US 6,445,794 B1
(45) Date of Patent: *Sep. 3, 2002

(54) SYSTEM AND METHOD FOR SYNCHRONIZING ONE TIME PAD ENCRYPTION KEYS FOR SECURE COMMUNICATION AND ACCESS CONTROL

(75) Inventor: Adam Shefi, Ramat Gan (IL)

(73) Assignees: Benyamin Ron, Tel Aviv (IL); Worcop Investment Ltd., Tortola ( * ) Notice: Subject to any disclaimer, the term of this patent is extended or adjusted under 35 U.S.C. 154(b) by 0 days.

This patent is subject to a terminal disclaimer.

(21) Appl. No.: 09/104,014

(22) Filed: Jun. 24, 1998

(51) Int. Cl.[7] .............................. H04L 9/22; H04L 9/12
(52) U.S. Cl. ............................ 380/46; 380/43; 380/260
(58) Field of Search ................................ 380/262, 277, 380/278, 268; 705/44

(56) References Cited

U.S. PATENT DOCUMENTS

| | | | | |
|---|---|---|---|---|
| 1,310,719 A | * | 7/1919 | Vernam | 380/33 |
| 4,630,201 A | * | 12/1986 | White | 705/44 |
| 5,293,576 A | * | 3/1994 | Mihm, Jr. et al. | 713/170 |
| 5,533,128 A | * | 7/1996 | Vobach | 380/28 |
| 5,544,245 A | * | 8/1996 | Tsubakiyama | 380/21 |
| 5,841,871 A | * | 11/1998 | Pinkas | 713/155 |

OTHER PUBLICATIONS

Menezes, A., et al. "Handbook of Applied Cryptography" CRC Press LLC. 1997. CIP 1996. pp. 20–21 and 169–175.*
Menezes, A. J. et al. Handbook of Applied Cryptography. CRC Press LLC. CIP 1996. pp. 21, 192.*
Newton, H. Newton's Telecom Dictionary, Eighth ed. Flatiron Publishing. 1994. p. 581.*

\* cited by examiner

*Primary Examiner*—Gail Hayes
*Assistant Examiner*—Anthony DiLorenzo
(74) *Attorney, Agent, or Firm*—D'Vorah Graeser

(57) ABSTRACT

A method for generating an identical electronic one-time pad at a first location and a second location, the method comprising the steps of: (a) providing a first electronic device at the first location and a second electronic device at the second location, each of the first and the second electronic devices having: (i) a non-volatile memory; (ii) a processor; (iii) at least one table of true random numbers being stored on the non-volatile memory, the table being identical for the first and the second electronic devices; and (iv) at least one software program for obtaining a true random number from the table, the software program being stored on the nonvolatile memory and the at least one software program being operated by the processor; (b) providing a communication channel for communication between the first electronic device and the second electronic device; (c) selecting a selected true random number from the table at the first and the second electronic devices according to a selection procedure, the selection procedure being identical for the first and the second electronic devices, the selection procedure including exchanging at least a portion of a key between the first and the second electronic devices over the communication channel, such that the selected true random number is identical for the first and the second electronic devices; and (d) forming at least a portion of the identical electronic one-time pad at the first and the second locations with the selected true random number.

25 Claims, 5 Drawing Sheets

SYSTEM AND METHOD FOR SYNCHRONIZING ONE TIME PAD ENCRYPTION KEYS FOR SECURE COMMUNICATION AND ACCESS CONTROL

FIELD AND BACKGROUND OF THE INVENTION

The present invention relates to a system, a device and a method of providing secure communication between two parties, and in particular for providing such secure communication over a communication network.

Secure communication between two parties has always been an important but difficult task. The moment information is shared between two parties, a third, unauthorized party may be able to access this information as well. The problem is magnified when the two authorized parties are separated by a distance, so that information must be passed in the form of messages rather than by direct communication. Historically, the content of messages has sometimes been protected by cryptography, in which the content is altered by transformation into another form which is understandable only by the intended recipient or recipients of the message.

As the technology for transferring information has become increasingly complex and sophisticated, so has the technology of cryptography. Currently, cryptography may be performed by encoding the original message into an incomprehensible protected message according to mathematical algorithms using a particular key. Only the correct recipient should have both the same algorithm and the particular key needed to decode the protected message into the original message. Thus, the incomprehensible encoded message can be freely transmitted over a relatively insecure communication channel such as a telephone network, while remaining secure to all but the correct recipient.

Of course, the security of the encoded message depends both upon the possession of the key and the ability of the algorithm to resist being broken by an unauthorized third party. A third party could try to guess the identity of the key, in effect copying it, and then use the actual key to decode the message. Also, just as a door may be broken without having the key to the lock, so can a cryptography algorithm be broken in the absence of the correct mathematical key. In both cases, the longer the key, the more difficult either guessing attacks or brute force attacks become.

However, as computer technology has become ever faster, many heretofore "impregnable" algorithms have yielded to brute force attacks. For example, the DES (Data Encryption Standard) algorithm with a 56-bit key was thought to be impregnable at the time of its inception in 1976. By 1993, DES with the 56-bit key could theoretically have been broken in 7 hours by brute force with a highly sophisticated computer. To solve the problem, the key was lengthened to 128 bits. Other algorithms have proven to be susceptible to brute force attacks, and are now used with longer keys to reduce their vulnerability to attacks.

Since computer technology is still becoming increasingly powerful and faster, there is no reason to expect that the "impregnable" algorithms of today will not fall to a brute force attack tomorrow. Furthermore, certain algorithms have become easier to crack by the discovery of new mathematical functions, such as new factoring algorithms, which cannot be easily anticipated. Such functions can render "secure" cryptography algorithms vulnerable to attack. Thus, expecting mathematical algorithms alone to provide all of the security for information transfer is clearly not sufficient.

An additional layer of security is provided by using public key-private key pairs. In this system, used for example in the PGP (Pretty Good Privacy) cryptography software, the sender encrypts the message using the public key, and the recipient decrypts it with the private key.

As noted previously, such security measures through cryptography are important for sending secure messages over insecure communication channels. For example, voice and facsimile transmissions are typically sent over telephone networks, which can be tapped. The problem is magnified for such highly insecure communication channels as cellular phones, which are easy to access with hardware, such as a scanner, which can be purchased "off the shelf" at an electronics store. Thus, devices and methods for securing communication on insecure channels are important.

One example of such a method is disclosed in U.S. Pat. No. 5,473,689 to Eberhard. In this method, two electronic devices generate and exchange two random numbers, so that each device knows both numbers. Both numbers are then encrypted and compared, by exchanging a portion of each encrypted number. Communication only occurs if both encrypted numbers match. One problem with this method is that both sides must have the same key for the encryption and decryption of the random numbers. Thus, this key is vulnerable to theft by an unauthorized party, particularly if the key is exchanged.

U.S. Pat. No. 5,564,106 to Puhl et al. describes a method of providing blind access to an encryption key, such that the key of a first group member is provided to a second group without the first group knowing the identity of the first group member. Such a method is useful for enabling a government organization which is investigating an employee of a business to access the key of that employee, without enabling the business to know the identity of the employee under investigation. However, this method is not helpful for secure communication over an insecure channel, since it presupposes the security of the original encryption method.

One drawback of some currently available encryption methods for communication over an insecure channel is that they require the user to perform a number of steps before communication occurs. If such encryption were to be performed automatically, for example by a semiconductor chip contained with a communication device, the user would not need to actively perform the encryption before communication would occur. One example of such a device is disclosed in U.S. Pat. No. 5,539,828 to Davis. This device has both a pair of keys, public and private, and a digital certificate which includes the public key encrypted with the private key. Essentially, this device has automated public key encryption, so that again communication through the device is only as secure as the encryption method.

Other commercially available hardware devices, or hardware/software systems, suffer from the same potential drawback: the devices and systems are only as secure as the encryption method which is employed. Examples of such devices and systems include the information security products of Litronic (Costa Mesa, Calif., USA), which include both smartcard readers and cryptographic device drivers, and software for encrypting textual and database information; the network security products of Cylink Corp. (San Francisco, Calif., USA), which help ensure security on LAN (Local Area Networks) and WAN (Wide Area Networks), through the use of the DES encryption algorithm; and the products of Cylink (Sunnyvale, Calif., USA), which provide rapid encryption for digital networks, again using either DES or a proprietary encryption algorithm. These are only a sampling of the many such products available on the market today, indicating the wide-spread popularity of, and commercial need for, products for secure communication and encryption.

Unfortunately, as noted previously, all of these products are only as secure as the encryption method employed. Furthermore, all of the encryption methods employed are based upon mathematical algorithms and keys, which means that they can potentially be cracked by a brute force attack. As computer technology becomes more sophisticated and as new mathematical functions related to these algorithms become available, such brute force attacks become easier to manage, thereby rendering the encrypted data vulnerable to unauthorized interception.

There is one type of encryption, however, which is theoretically unbreakable by a brute force attack on the encrypted message itself. This type of encryption involves random numbers which are as long as the message itself. There is no potentially breakable algorithm. Rather, the message is encoded according to a random number of the same length as the message. The encoded message can then only be decoded by using exactly the same random number as was used for the encoding. Each such random number is used only once for encoding a message. Since random numbers are used for the encoding, the random number used for the encoding cannot be guessed or derived according to a mathematical algorithm, or according to statistical analysis. In order to obtain the random number by guessing, the entire random number used for encoding a particular message must be guessed, which is effectively guessing the message itself. Furthermore, obtaining one such random number by reverse-engineering will not enable other messages to be decoded, since subsequent messages will be encoded with different random numbers.

Currently, this encryption method requires both parties to have the same random number, typically by using a one-time pad of such numbers. This pad can be literally a physical pad of paper, on which a series of random numbers is written. The pad could also be in the form of an electronic storage hardware device such as a diskette. As a message is sent or received, each party uses one number on the pad, and then discards the random number. Since both parties have the same pad and are using the same random numbers, messages can be securely encoded and decoded, without fear of a brute force attack. Of course, the pad of paper or the diskette itself could be physically stolen or copied, but such an occurrence is relatively easier to guard against and to detect than electronic theft of the messages.

One severe drawback of the "one-time pad" in currently available implementations is that both parties must have the same physical pad of paper or diskette before communication can occur, thereby restricting communication to parties which have made the necessary arrangements in advance. Also, the protection of the messages is only as good as the physical protection of the one-time pad itself on both sides. Furthermore, both parties must take certain steps in order for the encoding and decoding steps to occur. In addition, the physical pad of paper or computer diskette cannot hold an infinite quantity of these random numbers, so that the physical pad of paper or the computer diskette must be periodically replaced. Thus, as currently available, the method is both cumbersome and not practicable for wide-spread communication between many different parties.

There is therefore a need for, and it would be useful to have, a method and a system for producing and using an electronic "one-time pad", for example for secure communication on an insecure channel or for secure identification, which is automated and practicable for wide-spread communication and other uses, yet which is not liable to a brute force attack on the "one-time pad" itself.

SUMMARY OF THE INVENTION

According to the present invention, there is provided a method for generating an identical electronic one-time pad at a first location and at a second location, the method comprising the steps of: (a) providing a first electronic device at the first location and a second electronic device at the second location, each of the first and the second electronic devices having: (i) a non-volatile memory; (ii) a processor; (iii) at least one table of true random numbers being stored on the non-volatile memory, the table being identical for the first and the second electronic devices; and (iv) at least one software program for obtaining a true random number from the table, the software program being stored on the non-volatile memory and the at least one software program being operated by the processor; (b) providing a communication channel for communication between the first electronic device and the second electronic device; and (c) selecting a selected true random number from the table at the first and the second electronic devices according to a selection procedure, the selection procedure being identical for the first and the second electronic devices, the selection procedure including exchanging at least a portion of a key between the first and the second electronic devices over the communication channel, such that the selected true random number is identical for the first and the second electronic devices; and (d) forming at least a portion of the identical electronic one-time pad at the first and the second locations with the selected true random number.

Preferably the identical electronic one-time pad is of any desired length.

According to preferred embodiments of the present invention, the step of selecting the selected true random number from the table includes the steps of: (i) generating a first true random number at the first electronic device and a second true random number at the second electronic device; and (ii) sending the first true random number to the second electronic device and the second true random number to the first electronic device through the channel, the first and the second true random numbers forming the at least a portion of the key. Preferably, the method further comprises the step of: (iii) obtaining an obtained true random number from the table with a pointer, the pointer being substantially identical to the key, such that the selected true random number is selected according to the obtained true random number. More preferably, the selected true random number is the obtained true random number.

Alternatively and more preferably, the method further comprises the step of: (ii-a) merging the first and the second true random numbers to form the at least a portion of the key.

According to other preferred embodiments of the present invention, at least one of the first and the second electronic devices includes a source of physical random phenomena, such that at least one of the first and the second true random numbers is generated from the source of physical random phenomena. Preferably, the source of physical random phenomena is selected from the group consisting of a source of acoustic noise and a source of thermal noise.

According to other preferred embodiments of the present invention, at least one of the first and the second electronic devices features a pseudorandom number generator being operated by the processor according to at least one software program being stored in the non-volatile memory, the pseudorandom number generator being operated substantially continuously for an undefined period of time, the step of generating at least one of the first and the second true random numbers including the step of outputting an output number from the pseudorandom number generator.

Preferably, the method further comprises the steps of: (iv) providing at least one identical pseudorandom number generator at the first and the second electronic devices, the at least one pseudorandom number generator being operated by the processor according to at least one software program being stored in the non-volatile memory; (v) obtaining an obtained true random number from the table with a first pointer, the first pointer being substantially identical to the key; (vi) giving the obtained true random number to the at least one pseudorandom number generator as a seed; (vii) obtaining a generated pseudorandom number from the at least one pseudorandom number generator, the generated pseudorandom number being identical for the first and the second electronic devices; and (viii) selecting the selected true random number from the table by using the generated pseudorandom number as a second pointer. More preferably, the step of selecting the selected true random number further comprises the steps of: (1) generating a second generated pseudorandom number from the at least one pseudorandom number generator, the second generated pseudorandom number being identical for the first and the second electronic devices; and (2) merging the second generated pseudorandom number with the selected true random number to form a merged true random number, the merged true random number being the selected true random number. Most preferably, the method further comprises the step of repeating the steps (vi)–(viii) and (1) and (2) at least once, wherein the selected true random number is the obtained true random number for step (vi) and the second pointer is the selected true random number from step (2) for repeating these steps. Preferably, a plurality of selected true random numbers is obtained by repeating this process at least once.

According to still other preferred embodiments of the present invention, the method further comprises the steps of: (d) encrypting a message by the first electronic device according to the one-time pad to form an encrypted message by merging at least a portion of the message with the selected true random number from the one-time pad according to an invertible merging function; and (e) sending the encrypted message to the second electronic device through the communication channel.

Preferably, the method further comprises the steps of: (f) receiving the encrypted message by the second electronic device; and (g) decrypting the encrypted message by performing the inverse function on the encrypted message to obtain the at least a portion of the message.

Preferably, the message is divisible into a plurality of portions. More preferably, the message is divisible into a plurality of bytes, and the at least a portion of the message is one of the plurality of bytes. Most preferably, the merging function includes the step of performing XOR operation with the selected true random number and the byte of the message.

Also preferably, the plurality of true random numbers is generated by changing the seed of a pseudorandom number generator at random times. The seed can be changed by replacing or modifying it with selected random numbers. The random times themselves can also be selected according to random numbers.

According to yet another preferred embodiment of the present invention, the method further comprises the steps of: (d) encrypting an identifier by the first electronic device according to the one-time pad to form an encrypted identifier by merging the identifier with the selected true random number from the one-time pad according to a merging function; (e) sending the encrypted identifier to the second electronic device; (f) receiving the encrypted identifier by the second electronic device; (g) decrypting the encrypted identifier by performing the inverse function on the encrypted identifier to obtain the identifier; and (h) determining access to an access-controlled module according to the identifier by the second electronic device.

Preferably, the merging function includes the step of performing XOR operation with the selected true random number and the identifier. More preferably, the access-controlled module is selected from the group consisting of a physical space, an electronic device, and data. Most preferably, the physical space is selected from the group consisting of a room, a safe, an automobile, a building and a secure installation. Also most preferably, the electronic device is selected from the group consisting of a computer, an automatic money machine, a television, a cellular phone and a regular phone. Also more preferably, the data is selected from the group consisting of information related to a bank account, electronic mail (e-mail) and voice mail.

According to another embodiment of the present invention, there is provided a method for determining access by a user to an access-controlled module, the method comprising the steps of: (a) providing a first electronic device for the user and a second electronic device for the access-controlled module, each of the first and the second electronic devices having: (i) a non-volatile memory; (ii) a processor; (iii) at least one table of true random numbers being stored on the non-volatile memory, the table being identical for the first and the second electronic devices; and (iv) at least one software program for obtaining a true random number from the table, the at least one software program being stored on the non-volatile memory and the at least one software program being operated by the processor; (b) providing a communication channel for communication between the first electronic device and the second electronic device; (c) selecting a selected true random number from the table at the first and the second electronic devices according to a selection procedure, the selection procedure being identical for the first and the second electronic devices, such that the selected true random number is identical for the first and the second electronic devices; (d) encrypting an identifier by the first electronic device by merging the identifier with the selected true random number according to a merging function to form an encrypted identifier; (e) sending the encrypted identifier to the second electronic device; (f) receiving the encrypted identifier by the second electronic device; (g) decrypting the encrypted identifier by performing a reverse-function on the encrypted identifier to obtain the identifier, the reverse-function being a reverse of the merging function; and (h) determining access to the access-controlled module according to the identifier by the second electronic device.

According to yet another embodiment of the present invention, there is provided a method for secure transmission of a message, the method comprising the steps of: (a) providing a first electronic device at a first location and a second electronic device at a second location, each of the first and the second electronic devices having: (i) a non-volatile memory; (ii) a processor; (iii) at least one table of true random numbers being stored on the non-volatile memory, the table being identical for the first and the second electronic devices; and (iv) at least one software program for obtaining a true random number from the table, the at least one software program being stored on the non-volatile memory and the at least one software program being operated by the processor; (b) providing a communication channel for communication between the first electronic device and the second electronic device; (c) selecting a selected true random number from the table at the first and the second electronic devices according to a selection procedure, the selection procedure being identical for the first and the second electronic devices, such that the selected true random number is identical for the first and the second electronic devices; (d) encrypting the message by the first electronic device by merging at least a portion of the message with the selected true random number according to a merging function to form an encrypted message; and (e) sending the encrypted message to the second electronic device over the communication channel.

According to still another embodiment of the present invention, there is provided a device for generating an electronic one-time pad, comprising: (a) a non-volatile memory; (b) a processor; (c) a read-only table of true random numbers being stored on the non-volatile memory; (d) a first software program for obtaining an obtained true random number from the table, the first software program being stored on the non-volatile memory and the first software program being operated by the processor; (e) an input port for receiving at least a portion of a key; (f) a second software program for selecting a selected true random number according to the obtained true random number and a selection procedure, the selected true random number forming at least a portion of the electronic one-time pad; and (g) a read/write memory for storing the electronic one-time pad; the non-volatile memory, the processor and the input port being arranged on a single chip, and access into the chip being enabled only through the input port.

Preferably, the read/write memory is arranged on the single chip. Alternatively and preferably, the read/write memory is at a physically separate location.

Preferably, the second software program selects the selected true random number upon receipt of a command through the input port. Also preferably, the device further comprises an additional input port on the chip for receiving a reset signal, wherein the second software program selects the selected true random number until the chip receives the reset signal. Also preferably, the device further comprises (h) a generator for generating a generated true random number, the generated true random number forming a second portion of the key, the generator being located on the single chip; and (i) an output port, the output port being located on the single chip, such that the second portion of the key is transmittable through the output port.

More preferably, the generator includes a source of physical random phenomena, such that the generated true random number is generated from the source of physical random phenomena. Most preferably, the source of physical random phenomena is selected from the group consisting of a source of acoustic noise and a source of thermal noise.

Alternatively and more preferably, the generator is a pseudorandom number generator being operated by the processor according to at least one software program being stored in the non-volatile memory, the pseudorandom number generator being operated substantially continuously for an undefined period of time, such that the generated true random number is obtained from the pseudorandom number generator.

According to preferred embodiments of the present invention, the input port is capable of receiving a message, and at least one software program for encrypting the message to form an encrypted message according to the electronic one-time pad is stored on the non-volatile memory, the at least one software program being operated by the processor, the encrypted message being transmittable through the output port. Preferably, the input port is capable of receiving a message, and at least one software program for encrypting the message to form an encrypted message according to the electronic one-time pad is stored on a second non-volatile memory being located in a physically separate location from the chip, the at least one software program being operated by the processor, the encrypted message being transmittable through the output port.

According to other preferred embodiments of the present invention, the non-volatile memory contains an identifier and at least one software program for encrypting the identifier to form an encrypted identifier according to the electronic one-time pad, the at least one software program being operated by the processor, the encrypted identifier being transmittable through the output port.

According to still other preferred embodiments of the present invention, a plurality of read-only tables of random numbers is stored on the non-volatile memory, and at least one software program for selecting at least one of the tables is stored on the non-volatile memory and is operable by the processor, such that the electronic one-time pad is produced according to the at least one of the tables. More preferably, there is provided a system for secure communication, comprising: (a) a first device according to the preferred embodiments of the present invention; and (b) a second device according to the preferred embodiments of the present invention; wherein at least one of the plurality of read-only tables of random numbers is identical on the first device and on the second device, such that the software program is capable of selecting the at least one identical table.

Hereinafter, the term "message" refers to a collection of data in the form of bytes including, but not limited to, textual information and image information.

Hereinafter, the term "communication channel" refers to any connection between two electronic devices which enables communication to occur. Examples of communication channels include, but are not limited to, the regular telephony network, any computer network, both wireless cable and cable transmitted by wire, and the cellular phone network. Under certain circumstances, these communication channels may also be considered "insecure channels", by which it is meant that these types of communication channels are potentially, although not necessarily, susceptible to interception of transmitted data by an unauthorized third party. Hereinafter, the term "open channel" refers to a channel upon which no security measures have been imposed. Similarly, the term "open text" refers to text transmitted over any communication channel which has not been encrypted in any way.

Examples of electronic devices include, but are not limited to, facsimile machines, telephones, cellular telephones, televisions, any other type of device intended for communication by voice, satellite dishes, television transmitters, cable head-ends and computers. Hereinafter, the term "computer network" refers to a connection between any two computers which permits the transmission of data. Hereinafter, the term "computer" includes, but is not limited to, personal computers (PC) having an operating system such as DOS, Windows™, OS/2™ or Linux; Mackintosh™ computers; computers having JAVA™-OS as the operating system; and graphical workstations such as the computers of Sun Microsystems™ and Silicon Graphics™, and other computers having some version of the UNIX operating system such as AIX or SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the term "non-secure communication device" refers to any device which is not capable of performing the method of secure communication of the present invention. Similarly, the term "non-secure communication protocol" refers to any protocol other than the secure communication protocol of the present invention. As such, the term "non-secure" is not intended to indicate the actual security quality or characteristics of the non-secure device or of the non-secure protocol, but only to indicate that the device or protocol is not of the present invention.

Hereinafter, the term "true random number" refers to a number which is stochastically random, in the sense that it is not capable of being repeatedly regenerated at will. The term "pseudorandom number" refers to a number which is produced according to a mathematical algorithm and which can theoretically be repeatedly regenerated. The term "pseudorandom number generator" refers to a mathematical algorithm according to which a computer is able to generate a pseudorandom number. One characteristic of such a pseudorandom number generator is that the seed is automatically changed every time a pseudorandom number is generated. Hereinafter, the term "selection procedure" refers to both choosing an existing true random number from a table of true random numbers, for example, and to a procedure in which such an existing true random number is further changed, altered or manipulated.

Hereinafter, the term "automatic money machine" refers to a machine from which cash may be obtained upon inserting a card with a magnetic strip and entering an identification number such as a PIN (personal identification number).

BRIEF DESCRIPTION OF THE DRAWINGS

The foregoing and other objects, aspects and advantages will be better understood from the following detailed description of a preferred embodiment of the invention with reference to the drawings, wherein:

FIG. 4A is an illustrative example of a system for secure communication, while

BRIEF DESCRIPTION OF THE INVENTION

Figure 1:
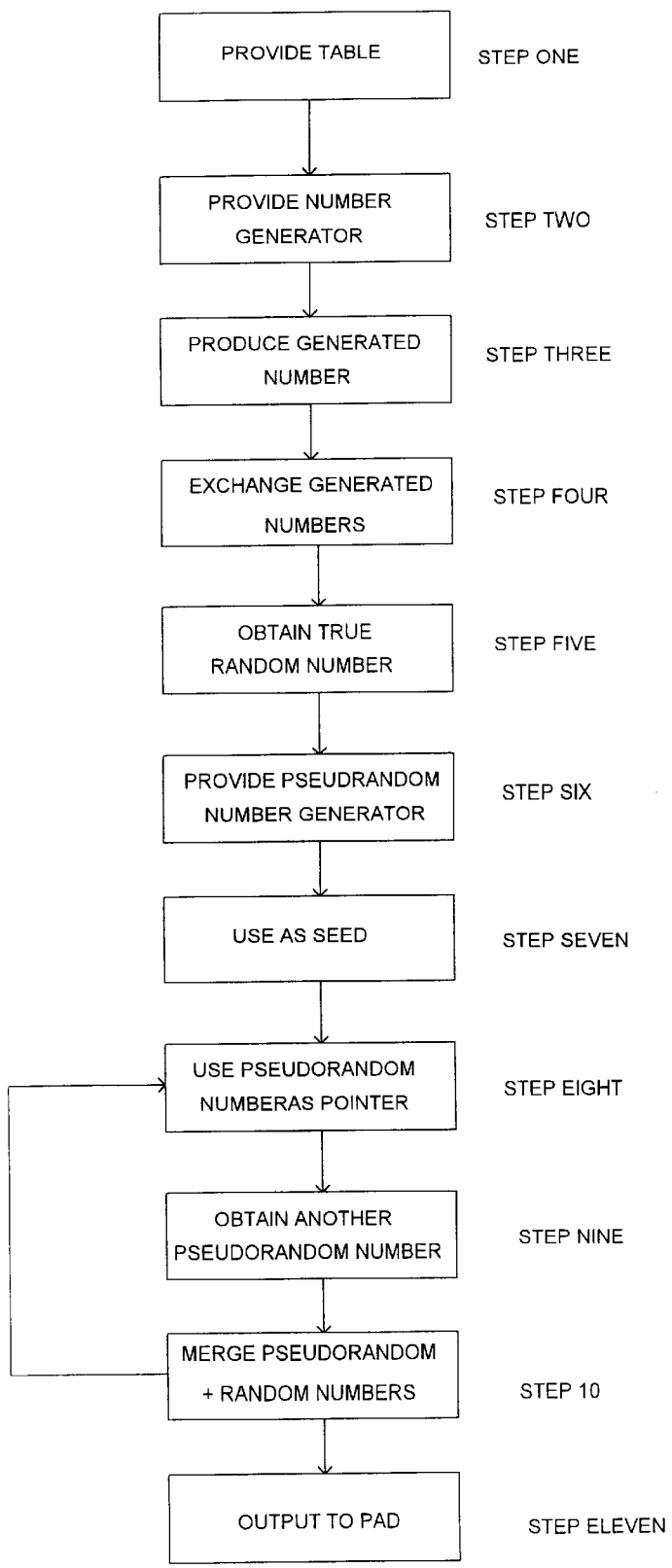
FIG. 1 is a flow chart of a method of producing an electronic "one-time pad" according to the present invention.

The present invention is directed toward a method and a system for producing and using a practically unlimited number of electronic "one-time pads", for example for secure communication over an insecure channel, or for secure identification. The system includes an electronic device, for example a semiconductor chip, which contains at least one table of random numbers, and which is able to generate an electronic "one-time pad". In order for secure communication to take place, each party must have this chip or another form of the electronic device of the present invention.

Any two parties having the electronic device of the present invention can then communicate securely or perform a secure identification procedure. In either case, the two parties preferably send at least one random number to each other as part of a key. The key is then used as part of the method of the present invention for generating an electronic "one-time pad" by selecting at least one true random number from a table of true random numbers according to a selection procedure. The "one-time pad" may then be used for encrypting a message, for example. However, since the "one-time pad" is used only once, it cannot be detected or otherwise obtained by analysis. Furthermore, if one bit of the key is changed, a completely different "one-time pad" is obtained. Each "one-time pad" is generated by each electronic device of each party at the initiation of communication between the two parties, and may be of any desired length. Thus, the "one-time pad" is generated as required for communication between two parties, and is then preferably discarded.

According to preferred embodiments of the present invention, each party may have more than one electronic device according to the present invention. For example, a bank might have an electronic device according to the present invention with one table or set of tables of true random numbers for internal communication, and another electronic device or even the same device according to the present invention with a different set of tables for communication with customers. Thus, although secure communication can be performed between any two parties having the electronic device according to the present invention, each party may have more than one such device, or one such device with more than one set of tables of true random numbers, for communication with other parties at multiple locations according to a hierarchy of communication between members of different groups.

As noted previously, the generation of the "one-time pad" depends upon true random numbers. However, the chip or other electronic device according to the present invention is capable of producing a practically infinite number of random numbers, so that devices having this chip would theoretically be able to communicate for many years substantially without using the same number more than once. Thus, the method, device and system of the present invention relate to the generation and single use of an electronic "one-time pad" in two locations substantially simultaneously.

DETAILED DESCRIPTION OF PREFERRED EMBODIMENTS

The present invention is directed toward a method and a system for producing and using a practically unlimited number of electronic "one-time pads", for example for secure communication over an insecure channel, or for secure identification. The system includes an electronic device, for example a semiconductor chip, which can generate a "one-time pad" of random numbers. In order for communication to take place, each party must have this chip. However, the chip is capable of producing an almost infinite number of random numbers, so that devices having this chip would theoretically be able to communicate for many years substantially without using the same number more than once.

In other preferred embodiments of the present invention, devices incorporating the system of the present invention are described. Still other preferred embodiments describe a method and a system, as well as related electronic devices, for the forgery-resistant identification of a subject, for example to determine access to a physical space such as a safe or an automobile, to an electronic device such as a computer or an automatic money machine, or to data such as information related to a bank account.

Also encompassed by the present invention is a method for generating a practically unlimited quantity of identical true random numbers at a plurality of locations simultaneously. The following method is preferably embodied as a software module operated by a data processor. In the first step, a true random number is selected from at least one table containing true random numbers according to a pointer. The pointer is known to the plurality of locations, so that the selected true random number is identical at all locations. The selected true random number is then combined with at least one pseudorandom number generated by at least one pseudorandom number generator to form the final true random number. The pseudorandom number generator is the same at all locations, and has the same seed at all locations, so that the same pseudorandom number is generated at all locations. Thus, the same final true random number is formed at all locations.

The principles and operation of a method, a device and a system for generating an electronic "one-time pad" according to the present invention may be better understood with reference to the drawings and the accompanying description, it being understood that these drawings are given for illustrative purposes only and are not meant to be limiting.

Referring now to the drawings, FIG. 1 depicts an illustrative method for generating identical copies of practically unlimited electronic "one-time pads" of substantially any desired length in two different locations, according to the present invention. In this method, true or stochastic random numbers are selected according to a protocol which enables the same true random numbers to be selected in both locations. The method could be implemented as a software program being operated by a computer, for example. In this implementation, the two different locations could be two different computers connected by a network, so that communication would be provided through the communication hardware of the computer and the network as is well known in the art.

At the very least, both locations should have an electronic device capable of performing the method of the present invention. The electronic device should include a non-volatile memory and a processor. The term "electronic device" is not intended to imply that both the non-volatile memory and the processor can only be located within a single device, such as a semiconductor chip. Instead, the non-volatile memory and the processor could be located within a single computer, or even within two different computers, for example.

Preferably, both electronic devices at the first and the second locations are connected through a communication channel, substantially as previously defined.

In step one of the method, at least one table of true random numbers is provided which is identical at both locations, referred to as "location 1" and "location 2". The true random numbers could be obtained from a book of such numbers, for example. For the purposes of this discussion, each true random number is designated by a sequential number which functions as a pointer. For example, the first random number in the table is designated with the number "one", the second random number is designated with the number "two", and so forth. The table of true random numbers is stored on the non-volatile memory of the electronic device.

In addition, a software program is provided which can access the table of true random numbers in order to obtain a true random number from the table. The software program is operated by the processor and is stored on the non-volatile memory. Hereinafter, the phrase "to obtain a true random number" refers to the act of directly reading or accessing such a number from the table of true random numbers.

In step two of the method, a number generator is provided, which may be identical or different at location 1 and location 2. A number generator is either a mathematical algorithm performed by a computational device, such as a PC (personal computer) computer, which generates pseudorandom numbers from a seed, or a source of physical random phenomena, such as a device which generates thermal noise or acoustic noise, for example.

In either case, preferably the number generator is used to produce true random numbers. For the source of physical random phenomena, this effect is inherent in the properties of the source. For the mathematical algorithm, this effect is achieved by operating the number generator for an undefined period of time, starting from a seed which is preferably continuously altered by the output of the number generator, and then by using a generated number as necessary. In this situation, the number generator will effectively act as a roulette wheel, since generated numbers will be selected essentially at random, and will therefore not be predictable. One example of such a number generator is a pseudorandom number generator operated with a seed from a random event.

In step three of the method, the number generator at location 1 and location 2 produces at least one number, designated as a first generated number and a second generated number. For clarity of description, only two generated numbers, one at each location, will be referred to herein, it being understood that each location could generate a plurality of such numbers. In addition, the number of generated numbers produced by each side is not necessarily identical. In step four, the first generated number is sent from location 1 to location 2, while the second generated number is sent from location 2 to location 1. Thus, each location has all of the generated numbers, which collectively form at least a portion of the "one-time key" to the one-time pad.

Preferably, the "one-time key" is formed by manipulating these generated numbers, for example by merging these generated numbers to form at least one merged number. The merged number would then be the "one-time key".

In step five, the "one-time key" is used to obtain at least one true random number from the table according to the pointer, such as a sequential number, by which the true random number is designated. For example, both the first and second generated numbers could be combined to obtain one true random number, possibly by using the first generated number to designate a portion of the table, while the second generated number is used as the pointer to the specific true random number. Alternatively and preferably, each generated number could be used to obtain a true random number, so that two true random numbers are obtained.

At this point, the method could end, with the generation of at least one, and preferably a plurality of, true random numbers, such that the obtained true random number is the selected true random number which forms at least a portion of the one-time pad. However, according to preferred embodiments of the present invention, the method continues with the provision of at least one pseudorandom number generator at each location in step six, the at least one pseudorandom number generator being operated by the processor of each electronic device according to at least one software program stored in the non-volatile memory of each electronic device. A pseudorandom number generator is a mathematical algorithm performed by a computational device, such as a PC (personal computer) computer, which generates pseudorandom numbers from a seed. This pseudorandom number generator is preferably different from the number generator of step one. However, the pseudorandom number generator must be identical at both locations, such that if the same seed is given to the pseudorandom number generator on both sides, the same pseudorandom numbers will be generated as an output.

In step seven, the obtained true random number or numbers is used as a seed or seeds for a pseudorandom number generator at each location to generate a generated pseudorandom number which is identical at both locations. If there are 2 true random numbers, they are merged to form the seed. The pseudorandom number generator preferably modifies the seed so as to be able to run substantially without further intervention once given a particular seed.

In step eight, this pseudorandom number is used as a second pointer to a table of true random numbers in order to obtain a new true random number. The table of true random numbers for this step may the same table as for previous steps. Alternatively and preferably, the table may be different. However, this table of true random numbers must be identical at both location 1 and location 2, so that the true random number selected is identical at both location 1 and location 2. The selected true random number optionally and preferably forms the selected true random number.

Alternatively and preferably, in step nine, a second generated pseudorandom number is generated which is also identical at location 1 and location 2. This pseudorandom number may be generated with the pseudorandom number generator of step seven, or with a different pseudorandom number generator. However, both the pseudorandom number generator and the seed for that generator must be identical for both location 1 and location 2, so that the same pseudorandom number is obtained at location 1 and location 2. In step ten, the selected true random number selected in step eight is merged with the pseudorandom number generated in step nine to form a merged true random number. The step of merging must be performed by a function which maintains the probability distribution, so that the merged number is also a true random number. For example, the function could add them together or could perform an XOR logic bit-wise operation. Preferably, steps eight to ten are repeated at least once, with the selected or merged true random number forming the second pointer to the table of true random numbers. More preferably, the steps are repeated more than once.

In step eleven, the merged random number is output to be at least a part of the "one-time pad". The method can then be repeated from steps eight to eleven as many times as required to generate a "one-time pad" of the desired size.

Optionally, the plurality of true random numbers is generated by changing the seed of a pseudorandom number generator at random times. The seed can be changed by replacing or modifying it with selected random numbers.

The random times themselves can also be selected according to random numbers. As another option, at least one or more of the above steps of merging a true random number with a pseudorandom number can be used to generate the true random number. If more than one step is used, the steps can be in substantially any order.

One particular advantage of this method is that it enables a number from a table containing a finite number of random numbers to be selected in such a way that the location of each true random number cannot be uncovered by observing the output of the method. Also, although the table of true random numbers is finite, with only about a few hundred to a few thousand true random numbers used for example, the probability of using any particular sequence of true random numbers more than once is vanishingly small. For example, if four billion electronic devices according to the present invention were to have the same table containing the same 8,000 random numbers and were to use a 12-byte key to generate the "one-time pad", after all of the devices had generated a "one-time pad" once per minute for one year, only one such generated pad is expected to be identical to a previously generated pad. Thus, the method of the present invention enables a practically unlimited number of such "one-time pads" to be generated without repetition.

Figure 2A:
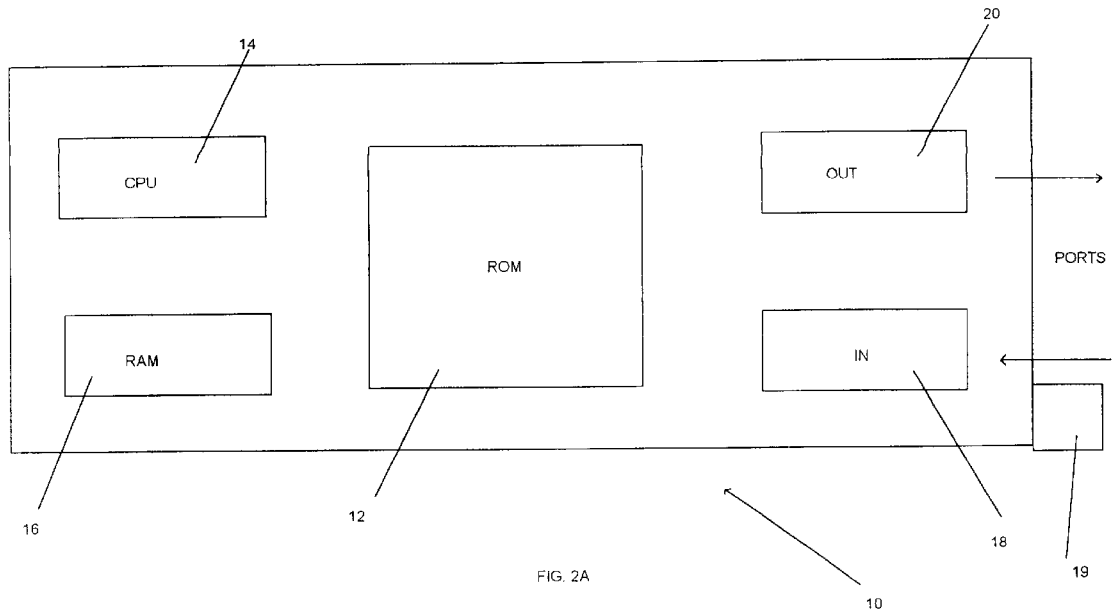
FIGS. 2A–2D illustrate an exemplary electronic device for producing the electronic "one-time pad" according to the present invention.

FIG. 2A shows a block diagram of an exemplary electronic device according to the present invention for producing an electronic "one-time pad" which is identical in two different locations. The exemplary device is shown in the embodiment of an integrated single chip, although not all of the components would necessarily need to be located on a single chip. It should be noted that the components described herein are intended as logical or virtual entities, identified according to function, and not necessarily as physical components. The operation of the electronic "one-time pad" is substantially as described in FIG. 1.

A one-time pad device 10 has an internal non-volatile memory 12, which may for example be a ROM (read-only memory). Non-volatile memory 12 contains at least one software program, which includes the instructions for the pseudorandom number generator and any operating instructions for operating one-time pad device 10, in particular for enabling communication between different one-time pad devices 10. Non-volatile memory 12 also includes at least one read-only table of true random numbers and a first software program for obtaining a true random number from the table. The pseudorandom number generator is a mathematical algorithm operated as software by a processor 14 which is capable of producing pseudorandom numbers. The first software program is also operated by processor 14.

In addition, one-time pad device 10 preferably features an additional read/write memory for both reading and writing information, such as the electronic one-time pad, shown herein as a RAM (random access memory) 16. RAM 16 is particularly necessary if non-volatile memory 12 is a ROM, for example. If non-volatile memory 12 is capable of being written to, such as a flash array for example, then non-volatile memory 12 and RAM 16 could optionally be combined into one memory. Alternatively and preferably, RAM 16 is located at a different, physically separate location than the other components of one-time pad device 10.

Preferably, one-time pad device 10 also has a separate number generator for generating true random numbers without interruption and without regard to communication from any other one-time pad device 10. If another pseudorandom number generator is used as the number generator, preferably this pseudorandom number generator begins producing numbers starting from a seed substantially as soon as one-time pad device 10 first receives electrical power. These numbers are selected as true random numbers, because the moment of selection is itself random, so that the number selected cannot be predetermined. More preferably, substantially every one-time pad device 10 has a different seed for this pseudorandom number generator. Most preferably, the number generator uses random events, such as a source of random phenomena such as thermal noise, acoustic noise, or radioactive disintegrations, to generate a true random number.

Also preferably, non-volatile memory 12, RAM 16 (if present), and processor 14 are not accessible from outside of one-time pad device 10. The table of true random numbers, and the software programs for enabling communication between different one-time pad devices 10 and for performing the method of FIG. 1, are therefore not accessible outside of one-time pad device 10. Instead, one-time pad device 10 has an input port 18 for receiving information, and an output port 20 for sending information. Preferably, communication is only possible through input port 18 and output port 20, so that one-time pad device 10 is otherwise sealed electronically after being programmed, for example by sending current into one or more legs of one-time pad device 10 so that certain internal connections are broken. Thus, a secure connection is provided between one-time pad device 10 and other external entities, so that the internal operations of one-time pad device 10 can proceed substantially without hindrance.

Preferably, the software program selects the selected true random number upon receipt of a command through input port 18.

Input port 18 and output port 20 are both connected to processor 14, which can be any standard microprocessor, for example. Processor 14 is able to operate any software program stored on non-volatile memory 12, to receive data from input port 18 and to send a certain restricted set of data out through output port 20. The set of data is restricted according to the software program stored in non-volatile memory 12, for example. Preferably, the set of data includes the portion of the "one-time key" which is sent out from one-time pad device 10 as described in FIG. 1. Similarly, although substantially any data could be received through input port 18, processor 14 would only be able to act on a relatively limited set of data, which could include for example the portion of the "one-time key" which is received from one-time pad device 10 as described in FIG. 1. Processor 14 can also preferably write data to, and read data from, RAM 16 as necessary for performing any operations required.

The operation of one-time pad device 10 is as follows. When one-time pad device 10 receives a signal from another such device (not shown), one-time pad device 10 produces the portion of the one-time key, as described previously, and sends this portion through output port 20 to the other such device. The signal could be through input port 18, through another leg of the chip, or according to any other identification protocol. In any event, the other device would then send the other portion of the one-time key to one-time pad device 10, which would receive this other portion through input port 18. The remainder of the operation of one-time pad device 10 would be substantially as described in FIG. 1, until the one-time pad of the desired length had been generated.

Optionally and preferably, one-time pad device 10 features an additional input port 19 for receiving a reset signal, such that the procedure for selecting the selected true random number is performed substantially until one-time pad device 10 receives the reset signal.

Figure 2B:
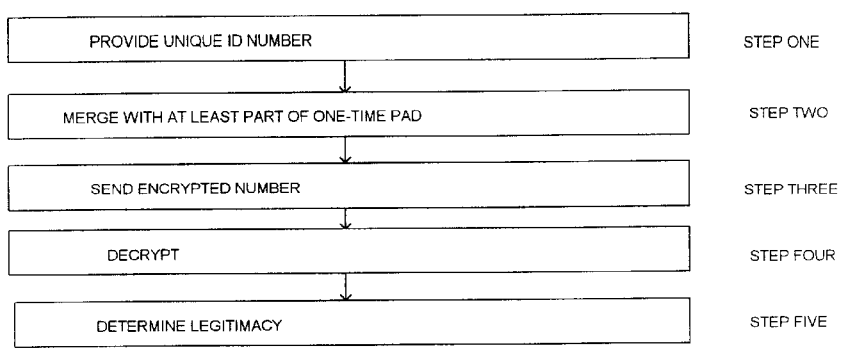

According to a preferred embodiment of one-time pad device 10, the operation of which is shown as a flow chart in FIG. 2B, non-volatile memory 12 would also contain a unique identification number to identify a specific one-time pad device 10 (step one). The identification number would be encrypted by one-time pad device 10, using at least a portion of the generated one-time pad, by merging the identification number with at least one number from the generated one-time pad, according to an invertible mathematical function (step two). For example, XOR operation could be performed with each digit of the identification number and a true random number from the generated one-time pad to form an encrypted identification number. The true random number used would be identical to both devices, for example by using the first random number from the generated one-time pad.

The encrypted identification number would then be sent from one-time pad device 10, and would be received by the other device (not shown) (step three). The other device could then decrypt the encrypted identification number, using the identical copy of the one-time pad which was generated as described previously, according to the inverse function of the function of step two (step four). For example, if the function of step two is addition, the inverse function is subtraction. The inverse function of XOR operation is the XOR operation itself. The identification number would serve as a proof of the legitimate identity of one-time pad device 10 (step five). An exemplary use of this embodiment of one-time pad device 10 would be to enable an organization, such as a bank, to identify legitimate customers with a legitimate identification number before starting communication, for example to perform a transaction.

Figure 2C:
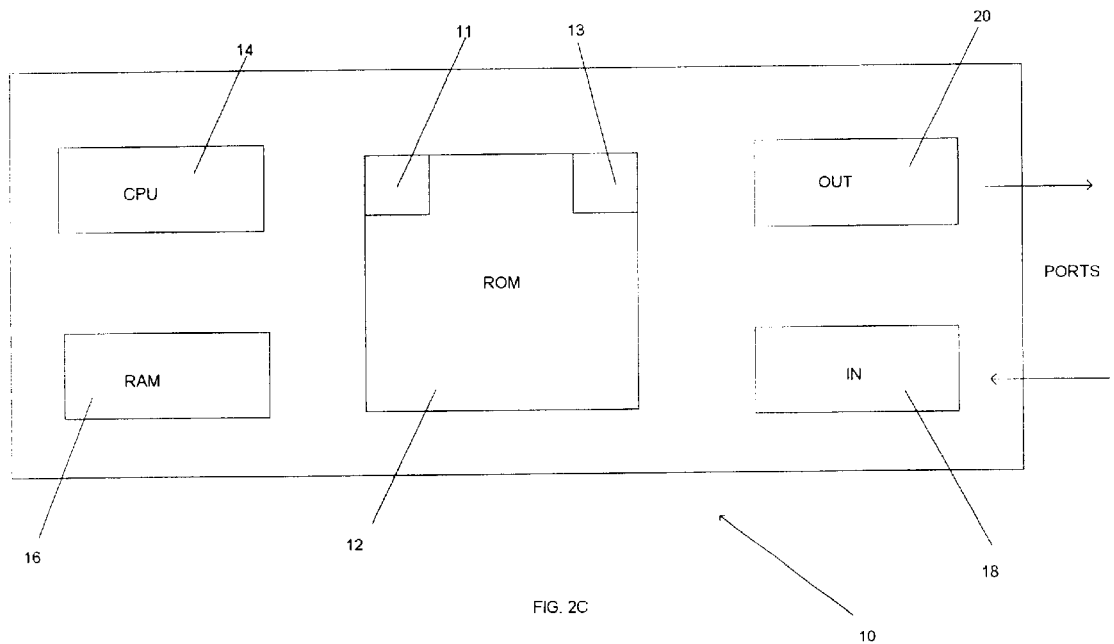

FIG. 2C shows a flow chart of the operation of another preferred embodiment of one-time pad device 10, in which one-time pad device 10 is used for encryption of a message. In step one, an additional software program, or an additional portion of the same software program, is provided on non-volatile memory 12 for execution by processor 14. After the one-time pad has been generated as described previously for step two, the message, either encrypted or as plain text, is received by one-time pad device 10 through input port 18 (step three). If the message is encrypted, one-time pad device 10 decrypts the message by using the one-time pad (step four). Alternatively, if the message is plain text, one-time pad device 10 encrypts the message by using the one-time pad. The process of encryption and decryption is similar to that described for the identification number of FIG. 2B.

For encrypting a message, the message is preferably divided into portions, for example into a plurality of bytes. Each portion is encrypted by merging with one true random number from the one-time pad according to an invertible function. For example, XOR operation could be performed with one true random number and each byte of the message. The inverse of that operation, which is the same operation for XOR, is then performed, again with the identical one-time number from the one-time pad, for decryption of the message.

The length of the one-time pad could optionally be predetermined by sending the number of portions of the message from the first one-time pad device 10 to another such device. Alternatively and preferably, since the first one-time pad device 10 is encrypting the message and has therefore calculated the number of portions of the message, the process of generating the one-time pad could simply continue until the proper length had been attained, at which time the first one-time pad device 10 could simply stop the process. Also alternatively and preferably, both one-time pad devices 10 could create and use the one-time pad substantially simultaneously, "on the fly" for decrypting or encrypting the message, more preferably without first exchanging such information as the length of the message.

Figure 2D:
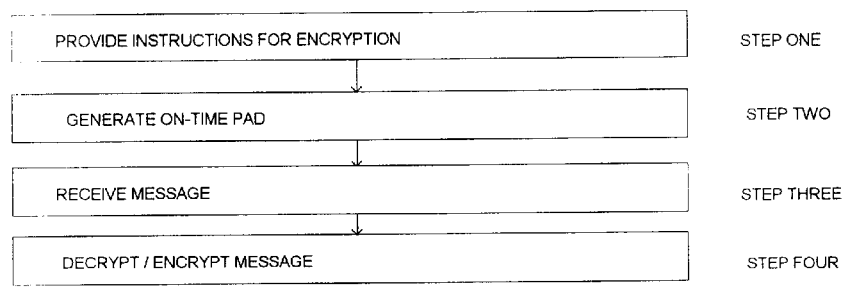

In a preferred embodiment of one-time pad device 10 as described in FIGS. 2A, 2B or 2C, and as shown in FIG. 2D, at least two sets of read-only tables of true random numbers, shown as set of tables 11 and set of tables 13, is provided on non-volatile memory 12. The term "set of tables" is used herein to include at least one such table. In this embodiment, at least one set of tables, such as set 13, would be for "public" communication with any other one-time pad device 10. At least one other set of tables, such as set 11, could be designated for a private group of users, such as users within a bank, for example. This set could be unique for this private group, so that no other one-time pad device 10 would have this same set outside of those operated by members of the private group. Of course, many such sets of tables of true random numbers could be provided. The choice of a particular set of tables could be made at the time of communication by the software program which operates one-time pad device 10. Thus, an additional layer of security would be provided for internal communication within the group, since only the members of the group would have this special set of tables.

Furthermore, preferably the number of one-time pad devices 10 with a particular set of tables 11, for example, would be recorded by a member of the group. If one such one-time pad device 10 with set of tables 11 would be stolen, lost or otherwise removed from a member of the group, the remaining one-time pad devices 10 with set of tables 11 could be removed from operation, and replace by a different group of one-time pad devices 10 with a different set of tables of true random numbers. Thus, access to any particular one-time pad device 10 with a special set of tables unique to one group could potentially be more closely regulated.

Figure 3:
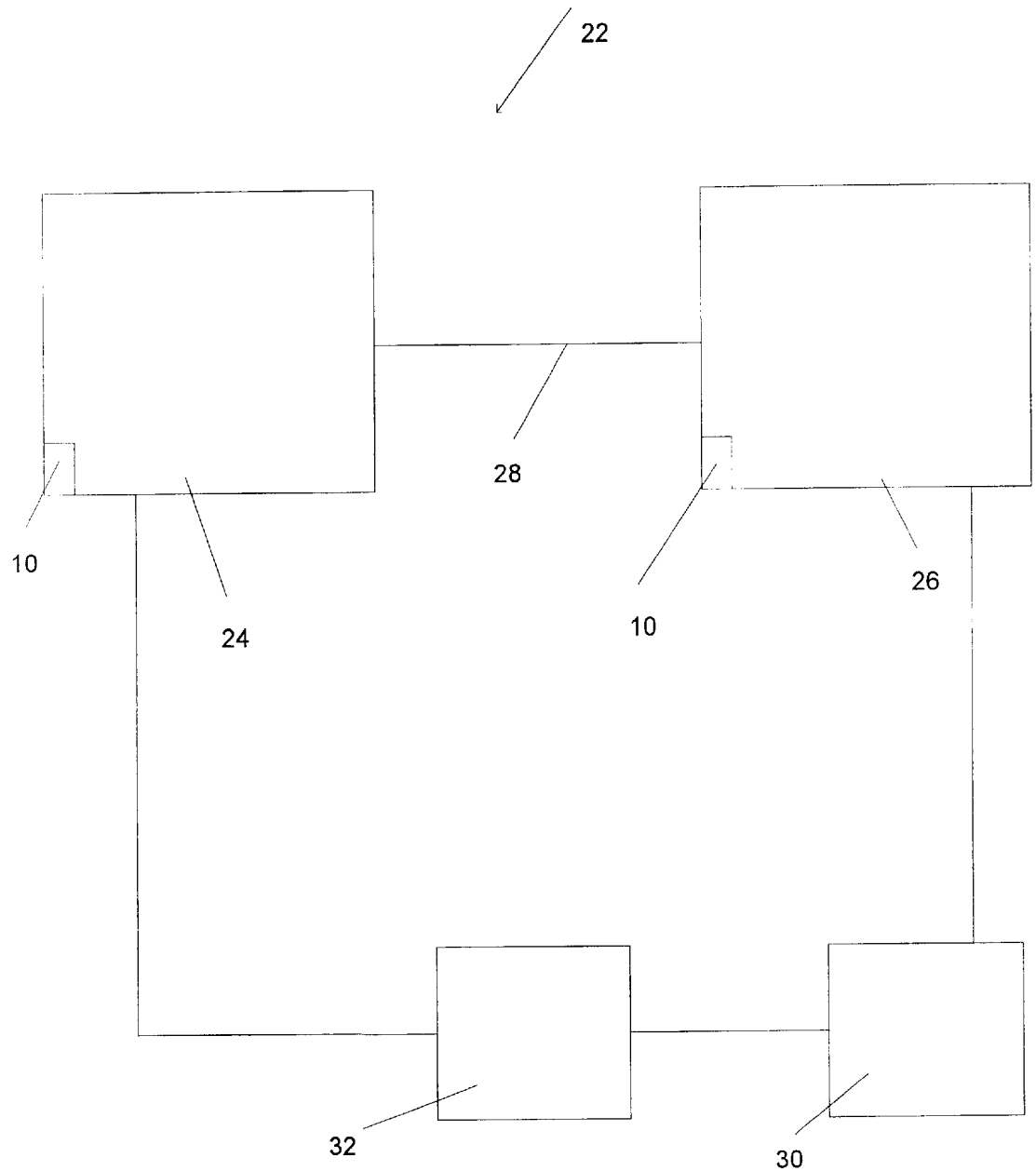
FIG. 3 is an illustrative example of a system using the device of FIGS. 2A and 2D according to the present invention.

FIG. 3 is a schematic block diagram of an illustrative example of a system for forgery-resistant identification of a subject, preferably incorporating the preferred embodiment of the electronic one-time pad device of FIGS. 2A and 2B. An identification system 22 includes a subject device 24 and an access device 26. Both subject device 24 and access device 26 each preferably feature one-time pad device 10. Alternatively, any electronic device capable of performing the operations described in FIG. 1 and FIGS. 2A–2D could be substituted for one-time pad device 10. In any case, subject device 24 and access device 26 should both be able to send and receive the necessary information, such as the components of the one-time key, in order to permit their respective one-time pad devices 10 to operate substantially as previously described.

Subject device 24 and access device 26 communicate through a communication channel 28. Communication channel 28 could be any one of a number of different types of channels including, but not limited to, channels using light signals of any wavelength such as infrared, other electromagnetic signals, audio signals, visual images, wired and wireless cable, or satellite transmission, as well as cellular phone networks, regular telephony networks or a computer network of any type.

Subject device 24 is operated by a user (not shown) who needs to be identified in order to gain access to an access-controlled module 30. For convenience, subject device 24 could be a small hand-held device similar in size to an electronic lock for an automobile or even as small as a smart card. Examples of access-controlled module 30 include, but are not limited to, a physical space such as a room, a safe, an automobile, a building or a secure installation; an electronic device such as a computer, a television, an automatic money machine, a cellular phone and a regular phone; and data such as information related to a bank account, electronic mail (e-mail) and voice mail. As will be noted from these examples, certain access-controlled modules 30 both require the user to be identified before operation and are able to encrypt any resultant information arising from actions of the user. Examples of access-controlled modules 30 which preferably have both characteristics include, but are not limited to, a regular telephone and a cellular phone.

Subject device 24 communicates with access device 26 substantially as described for FIGS. 2A, 2B and 2D. Briefly, non-volatile memory 12 of one-time pad device 10 within subject device 24 would also contain a unique identifier to identify a specific subject device 24. Examples of such an identifier include, but are not limited to, an identification number, a string of characters, a sequence of electronically-generated acoustic tones or substantially any other type of information which can be digitized. The identifier would be encrypted by one-time pad device 10, using at least a portion of the generated one-time pad, by merging the identifier with at least one number from the generated one-time pad, according to a mathematical function which must be reversible.

The encrypted identifier would then be sent from subject device 24 and would be received by access device 26, which could then decrypt the encrypted identifier as described previously. Access device 26 could then check the identifier against a list of identifiers for subject devices 24 which should enable the user (not shown) to be granted access to access-controlled module 30, for example, or could use another function to determine if the user should be allowed access. The identifier would serve as a proof of the legitimate identity of subject device 24, and thus presumably of the user.

Alternatively, the identifier could be stored and encrypted by access device 26, which would then send the encrypted identifier to subject device 24. Subject device 24 would then need to decrypt the encrypted identifier and to send some type of acknowledgment to access device 26 according to the identifier. Optionally, subject device 24 would send the response to another access-granting device 32, separate from access device 26. According to this configuration, access-granting device 32 would not necessarily need to include a one-time pad device 10, but could be an ordinary access-granting device 32 operable according to a signal received from subject device 24.

According to another preferred embodiment of identification system 22, in addition to, or as a replacement for, a static identifier, a true random number would be generated "on the fly" for subject device 24 and access device 26 by their respective one-time pad devices 10, according to the process for generating a one-time pad of true random numbers. Subject device 24 could then send this true random number to access device 26, which would compare this received true random number to the true random number generated by the one-time pad device 10 of access device 26. If the two numbers were identical, access could be granted to the user. If not, access could be denied, since the inability to select the same true random number would indicate that subject device 24 was not legitimate. Identification could be made more specific by use of a table or tables of true random numbers which are restricted to a private group of users, as described previously.

All of these different embodiments of identification system 22 could preferably be combined in parallel or in series with other existing modes of identification including, but not limited to, a smart card and reader, a magnetic strip card and reader, a device for registering voice prints or fingerprints, and even a simple manually operated mechanical lock and key.

Figure 4A:
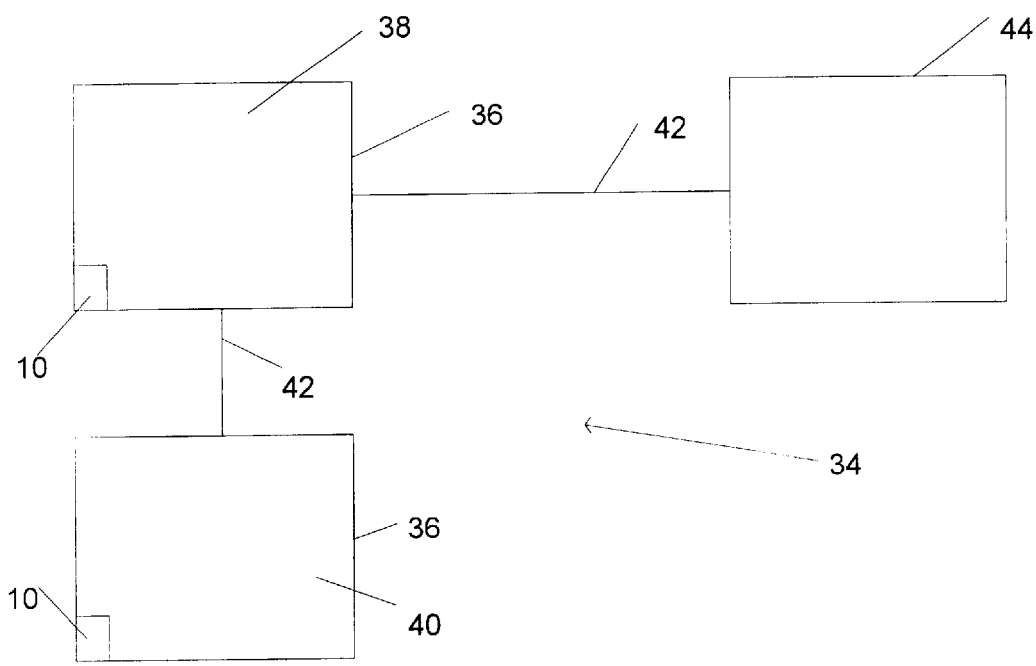

FIG. 4A shows an exemplary system for secure communication according to the present invention using the device of FIGS. 2A, 2C and 2D. A secure communication system 34 includes a plurality of secure communication devices 36, of which only two are shown for clarity of illustration, without any intention to be limiting in any way. The plurality of secure communication devices 36 could be facsimile machines or else connected to facsimile machines, for example. Each secure communication device 36 preferably features one-time pad device 10. Alternatively, any electronic device capable of performing the operations described in FIG. 1 and FIGS. 2A and 2C could be substituted for one-time pad device 10. In any case, secure communication devices 36 should both be able to send and receive the necessary information, such as the components of the one-time key, in order to permit their respective one-time pad devices 10 to operate substantially as previously described.

A first secure communication device 38 is connected to a second communication device 40 through a communication channel 42. Communication channel 42 is not necessarily secure from access or "eavesdropping" by an unauthorized party. Examples of communication channel 42 have been previously given and include, but are not limited to, the existing telephony network and cellular phone networks, and a computer network.

Communication occurs between first secure communication device 38 and second secure communication device 40 essentially as described for FIG. 2C. Briefly, first secure communication device 38 sends a request for communication through communication channel 42, for example by sending at least one true random number as a component of the one-time key. Next, second secure communication device 40 receives the request, and responds accordingly, for example by sending at least one other true random number as a component of the one-time key. First secure communication device 38 and second secure communication device 40 then generate a one-time pad as described for FIGS. 1, 2A, 2C and 2D. The message is then encrypted by first secure communication device 38, according to a substantially similar method as that described for FIG. 2C, and is then sent to second secure communication device 40. Second secure communication device 40 then decrypts the encrypted message substantially as described in FIG. 2C.

As also shown in FIG. 4A, secure communication system 34 can include one or more non-secure communication devices 44, of which only one is shown for clarity of illustration and without any intention to be limiting. If first secure communication device 38 sends a message to non-secure communication device 44 for example, first secure communication device 38 is able to determine that non-secure communication device 44 is not capable of performing the secure communication protocol. Such determination is made because non-secure communication device 44 is unable to respond to the request for secure communication made by first communication device 38, thereby causing first communication device 38 to switch to a non-secure communication protocol. Alternatively, if non-secure communication device 44 attempted to send a message to first communication device 38, non-secure communication device 44 would use a non-secure communication protocol to initiate communication. In such a situation, first communication device 38 would also respond by switching to a non-secure communication protocol. Preferably, first communication device 38 would be able to keep a record or log of such events, describing for example the identity of the non-secure communication device and the content of the message.

Optionally, in the example above first secure communication device 38 could instead alert the user (not shown) if any type of non-secure communication device was initiating communication. Preferably, the user could decide whether to be alerted if such non-secure communication was required in order to decide if non-secure communication with the non-secure communication device should be allowed. As another option, preferably the user could choose to be alerted only if first secure communication device 38 was attempting to initiate communication with non-secure communication device 44, for example. Thus, non-secure communication could be performed either automatically or according to the choice of the user.

Examples of secure communication devices 36 include, but are not limited to, a facsimile machine, a vocal scrambler, a modem, an Ethernet card, a regular telephone or a cellular telephone. In addition, secure communication device 36 could also provide access to signals from a television broadcasting facility, for example to enable the provision of "personalized" services to each television subscriber. Also, secure communication device 36 could enable the accurate identification of information from a remote meter for a utility, such as gas or electricity, so that the utility provider could positively identify the source and accuracy of such information, for example.

For these embodiments, secure communication device 36 would be transparent to the user, and would perform the secure communication protocol automatically, without reference to the user. A potential exception would be if communication was to be performed with non-secure communication device 44, in which case the user could optionally be alerted as described above.

Figure 4B:
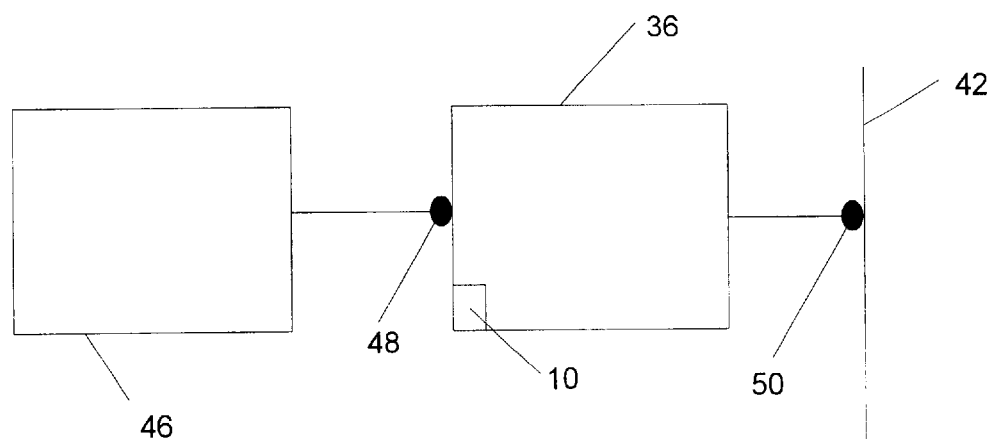
FIG. 4B is an exemplary communication device within the system of FIG. 4A.

Alternatively and preferably, secure communication device 36 could be used as a "black box" to which another electronic device was connected, as shown in FIG. 4B. As shown, a non-secure communication device 46 is connected to secure communication device 36. In the absence of secure communication device 36, non-secure communication device 46 would normally be connected directly to non-secure communication channel 42. Instead, in FIG. 4B, non-secure communication device 46 is connected to secure communication device 36, which is then connected to non-secure communication channel 42. Thus, all messages or communication to or from non-secure communication device 46 could be performed according to the secure communication protocol, without any alterations to non-secure communication device 46.

As an example only, without any desire of being limited, non-secure communication device 46 could be a facsimile machine, telephone or vocal scrambler, and non-secure communication channel 42 could be a regular telephone line. The telephone plug from non-secure communication device 46 would then be inserted into secure communication device 36 through a suitably adapted input port 48. An output port 50 would then be connected to the telephone jack which was the connection point to non-secure communication channel 42. Once these connections had been made, the combination of non-secure communication device 46 and secure communication device 36 would operate in a substantially similar fashion as if secure communication device 36 had actually been incorporated into non-secure communication device 46. However, the main advantage would be that existing non-secure communication devices could be adapted for secure communication according to the present invention. In addition, non-secure communication devices could be purchased "off the shelf" without the need for special manufacturing or factories for each type of non-secure communication device. Instead, all such devices could be adapted as desired with secure communication device 36, without inconvenience to the user.

In either situation, whether the secure communication device was incorporated within non-secure communication device, or whether secure communication device was added after manufacture, the additional functions or data operations which are required during operation could be recorded in RAM 16 of one-time pad 10 within secure communication device 36. Of course, RAM 16 would not be suitable for storage of information required after secure communication device 36 lost electrical power. If such information needed to be retained regardless of the status of secure communication device 36, a flash array, for example, could be substituted for RAM 16.

It will be appreciated that the above descriptions are intended only to serve as examples, and that many other embodiments are possible within the spirit and the scope of the present invention.

What is claimed is:

1. A method for generating an identical electronic one-time pad at a first location and at a second location, the method comprising the steps of:
   (a) providing a first electronic device at the first location and a second electronic device at the second location, each of said first and said second electronic devices having:
      (i) a non-volatile memory;
      (ii) a processor;
      (iii) at least one table of true random numbers being stored on said non-volatile memory said table being identical for said first and said second electronic devices; and
      (iv) at least one software program for obtaining a true random number from said table, said software program being stored on said non-volatile memory and said at least one software program being operated by said processor;
   (b) providing a communication channel for communication between said first electronic device and said second electronic device;
   (c) selecting a selected true random number from said table at said first and said second electronic devices according to a selection procedure, said selection procedure being identical for said first and said second electronic devices, said selection procedure including exchanging at least a portion of a key between said first and said second electronic devices over said communication channel, such that said selected true random number is identical for said first and said second electronic devices;
   (d) forming at least a portion of the identical electronic one-time pad at the first and the second locations with said selected true random number; and
   (e) repeating steps (c) and (d) at least once until the identical electronic one-time pad is formed at the first and the second locations, the identical electronic one-time pad being of a desired length, such that steps (c) and (d) are repeated until said desired length is reached.

2. The method of claim 1, wherein the step of selecting said selected true random number from said table includes the steps of:
   (i) generating a first true random number at said first electronic device and a second true random number at said second electronic device; and
   (ii) sending said first true random number to said second electronic device and said second true random number to said first electronic device through said channel, said first and said second true random numbers forming said at least a portion of said key.

3. The method of claim 2, further comprising the step of:
   (iii) obtaining an obtained true random number from said table with a pointer, said pointer being substantially identical to said key, such that said selected true random number is selected according to said obtained true random number.

4. The method of claim 3, wherein said selected true random number is said obtained true random number.

5. The method of claim 2, further comprising the step of:
   (ii-a) merging said first and said second true random numbers to form said at least a portion of said key.

6. The method of claim 2, wherein at least one of said first and said second electronic devices includes a source of physical random phenomena, such that at least one of said first and said second true random numbers is generated from said source of physical random phenomena.

7. The method of claim 6, wherein said source of physical random phenomena is selected from the group consisting of a source of acoustic noise and a source of thermal noise.

8. The method of claim 2, wherein at least one of said first and said second electronic devices features a pseudorandom number generator being operated by said processor according to at least one software program being stored in said non-volatile memory, said pseudorandom number generator being operated substantially continuously for an undefined period of time, the step of generating at least one of said first and said second true random numbers including the step of outputting an output number from said pseudorandom number generator.

9. The method of claim 1, further comprising the steps of:
   (d) encrypting a message by said first electronic device according to the one-time pad to form an encrypted message by merging at least a portion of said message with said selected true random number from the one-time pad according to a merging function; and
   (e) sending said encrypted message to said second electronic device through said communication channel.

10. The method of claim 9, further comprising the steps of:
    (f) receiving said encrypted message by said second electronic device; and
    (g) decrypting said encrypted message by performing the inverse function on said encrypted message to obtain said at least a portion of said message.

11. The method of claim 10, wherein said message is divisible into a plurality of bytes, and said at least a portion of said message is one of said plurality of bytes.

12. The method of claim 11, wherein said merging function includes the step of performing XOR operation with said selected true random number and said byte of said message.

13. The method of claim 1, further comprising the steps of:
   (d) encrypting an identifier by said first electronic device according to the one-time pad to form an encrypted identifier by merging said identifier with said selected true random number from the one-time pad according to a merging function;
   (e) sending said encrypted identifier to said second electronic device;
   (f) receiving said encrypted identifier by said second electronic device;
   (g) decrypting said encrypted identifier by performing a reverse-function on said encrypted identifier to obtain said identifier, said reverse-function being a reverse of said merging function; and
   (h) determining access to an access-controlled module according to said identifier by said second electronic device.

14. The method of claim 13, wherein said merging function includes the step of performing XOR operation with said selected true random number and said identifier.

15. The method of claim 13, wherein said access-controlled module is selected from the group consisting of a physical space, an electronic device, and data.

16. The method of claim 15, wherein said physical space is selected from the group consisting of a room, a safe, an automobile, a building and a secure installation.

17. The method of claim 15, wherein said electronic device is selected from the group consisting of a computer, an automatic money machine, a television, a cellular phone and a regular phone.

18. The method of claim 15, wherein said data is selected from the group consisting of information related to a bank account, electronic mail (e-mail) and voice mail.

19. A method for secure transmission of a message, the method comprising the steps of:
   (a) providing a first electronic device at the first location and a second electronic device at the second location, each of said first and said second electronic devices having:
      (i) a non-volatile memory;
      (ii) a processor;
      (iii) at least one table of true random numbers being stored on said non-volatile memory, said table being identical for said first and said second electronic devices; and
      (iv) at least one software program for obtaining a true random number from said table, said software program being stored on said non-volatile memory and said at least one software program being operated by said processor;
   (b) providing a communication channel for communication between said first electronic device and said second electronic device;
   (c) selecting a selected true random number from said table at said first and said second electronic devices according to a selection procedure, said selection procedure being identical for said first and said second electronic devices, said selection procedure including exchanging at least a portion of a key between said first and said second electronic devices over said communication channel, such that said selected true random number is identical for said first and said second electronic devices;
   (d) encrypting the message by said first electronic device by merging at least a portion of said message with said selected true random number according to a merging function to form an encrypted message;
   (e) repeating steps (c) and (d) at least once until the identical electronic one-time pad is formed at the first and the second locations, the identical electronic one-time pad being of a desired length, such that steps (c) and (d) are repeated until said desired length is reached; and
   (f) sending said encrypted message to said second electronic device over said communication channel.

20. The method of claim 19, wherein the message is divisible into a plurality of bytes, and said at least a portion of the message is one of said plurality of bytes.

21. The method of claim 20, wherein said merging function includes the step of performing an XOR operation with said selected true random number and said byte of the message.

22. A method for generating an identical electronic one-time pad at a first location and at a second location, the method comprising the steps of:
   (a) providing a first electronic device at the first location and a second electronic device at the second location, each of said first and said second electronic devices having:
      (i) a non-volatile memory;
      (ii) a processor;
      (iii) at least one table of true random numbers being stored on said non-volatile memory, said table being identical for said first and said second electronic devices; and
      (iv) at least one software program for obtaining a true random number from said table, said software program being stored on said non-volatile memory and said at least one software program being operated by said processor;
   (b) providing a communication channel for communication between said first electronic device and said second electronic device;
   (c) selecting a selected true random number from said table at said first and said second electronic devices according to a selection procedure, said selection procedure being identical for said first and said second electronic devices, said selection procedure including exchanging at least a portion of a key between said first and said second electronic devices over said communication channel, such that said selected true random number is identical for said first and said second electronic devices, further comprising the steps of:
      (i) generating a first true random number at said first electronic device and a second true random number at said second electronic device, wherein at least one of said first and said second electronic devices includes a source of physical random phenomena, such that at least one of said first and said second true random numbers is generated from said source of physical random phenomena; and
      (ii) sending said first true random number to said second electronic device and said second true random number to said first electronic device through said channel, said first and said second true random numbers forming at least a portion of said key; and
   (d) forming at least a portion of the identical electronic one-time pad at the first and the second locations with said selected true random number; and
   (e) repeating steps (c) and (d) at least once until the identical electronic one-time pad is formed at the first and the second locations, the identical electronic one-time pad being of a desired length, such that steps (c) and (d) are repeated until said desired length is reached.

23. A method for generating an identical electronic one-time pad at a first location and at a second location, the method comprising the steps of:
(a) providing a first electronic device at the first location and a second electronic device at the second location, each of said first and said second electronic devices having:
  (i) a non-volatile memory;
  (ii) a processor;
  (iii) at least one table of true random numbers being stored on said non-volatile memory, said table being identical for said first and said second electronic devices; and
  (iv) at least one software program for obtaining a true random number from said table, said software program being stored on said non-volatile memory and said at least one software program being operated by said processor;
(b) providing a communication channel for communication between said first electronic device and said second electronic device;
(c) selecting a selected true random number from said table at said first and said second electronic devices according to a selection procedure, said selection procedure being identical for said first and said second electronic devices, said selection procedure including exchanging at least a portion of a key between said first and said second electronic devices over said communication channel, such that said selected true random number is identical for said first and said second electronic devices, further comprising the steps of:
  (i) generating a first true random number at said first electronic device and a second true random number at said second electronic device, wherein at least one of said first and said second electronic devices features a pseudorandom number generator being operated by said processor according to at least one software program being stored in said non-volatile memory, said pseudorandom number generator being operated substantially continuously for an undefined period of time, such that the step of generating at least one of said first and said second true random numbers includes the step of outputting an output number from said pseudorandom number generator; and
  (ii) sending said first true random number to said second electronic device and said second true random number to said first electronic device through said channel, said first and said second true random numbers forming at least a portion of said key; and
(d) forming at least a portion of the identical electronic one-time pad at the first and the second locations with said selected true random number; and
(e) repeating steps (c) and (d) at least once until the identical electronic one-time pad is formed at the first and the second locations, the identical electronic one-time pad being of a desired length, such that steps (c) and (d) are repeated until said desired length is reached.

24. The method of claim 1, wherein said desired length is determined according to communication between the first and the second locations.

25. The method of claim 19, wherein said desired length is determined according to communication between said first and said second electronic devices.

* * * * *